United States Patent
Enomoto et al.

(10) Patent No.: US 9,834,665 B2
(45) Date of Patent: Dec. 5, 2017

(54) GLOVE AND GLOVE COMPOSITION

(71) Applicants: MIDORI ANZEN CO., LTD, Tokyo (JP); KOSSAN SDN BHD, Klang (MY)

(72) Inventors: Norihide Enomoto, Tokyo (JP); Taichi Ogawa, Tokyo (JP); Yusuke Sato, Tokyo (JP); Lawrence Siau Tian Lim, Klang (MY); Seek Ping Lee, Klang (MY); Eng Long Ong, Klang (MY)

(73) Assignee: KOSSAN SDN BHD, Klang (MY)

( * ) Notice: Subject to any disclaimer, the term of this patent is extended or adjusted under 35 U.S.C. 154(b) by 0 days.

(21) Appl. No.: 15/121,885

(22) PCT Filed: Feb. 27, 2015

(86) PCT No.: PCT/JP2015/055901
§ 371 (c)(1),
(2) Date: Aug. 26, 2016

(87) PCT Pub. No.: WO2015/129871
PCT Pub. Date: Sep. 3, 2015

(65) Prior Publication Data
US 2017/0015819 A1    Jan. 19, 2017

(30) Foreign Application Priority Data

Feb. 28, 2014   (JP) ................... 2014-054075

(51) Int. Cl.
| | |
|---|---|
| *C08K 3/18* | (2006.01) |
| *C08L 9/04* | (2006.01) |
| *C08K 3/22* | (2006.01) |
| *A41D 19/00* | (2006.01) |

(52) U.S. Cl.
CPC ............ *C08L 9/04* (2013.01); *A41D 19/0082* (2013.01); *C08K 3/22* (2013.01); *A41D 2600/20* (2013.01); *C08L 2201/52* (2013.01); *C08L 2205/02* (2013.01)

(58) Field of Classification Search
CPC .... C08L 9/04; C08L 2201/52; C08L 2205/02; A41D 19/0082; A41D 2600/20
USPC .......................................... 524/430
See application file for complete search history.

(56) References Cited

U.S. PATENT DOCUMENTS

2012/0246799 A1* 10/2012 Khoo .................. C08J 5/02
2/168

FOREIGN PATENT DOCUMENTS

| JP | 10036563 A | 2/1998 |
|---|---|---|
| JP | 2013508528 A | 3/2013 |
| JP | 2014074112 A | 4/2014 |
| WO | 2011068394 A1 | 6/2011 |
| WO | 2012043893 A1 | 4/2012 |
| WO | 2012043894 A1 | 4/2012 |
| WO | 2014034889 A1 | 3/2014 |

OTHER PUBLICATIONS

English translation of International Search Report for PCT/JP2015/055901 dated Jun. 2, 2015.

* cited by examiner

*Primary Examiner* — Hui Chin
(74) *Attorney, Agent, or Firm* — Pearne & Gordon LLP

(57) ABSTRACT

An emulsion composition includes (1) a carboxylated acrylonitrile butadiene elastomer containing an acrylonitrile residue in an amount of 23 to 30 wt % and an unsaturated carboxylic acid residue in an amount of 3 to 8 wt %, and (2) a polyacrylonitrile butadiene elastomer containing an acrylonitrile residue in an amount of 20 to 50 wt % and having a weight average molecular weight (in terms of styrene) of 7,000 to 50,000. The weight ratio of the component (1)/the component (2) is from 70/30 to 90/10.

9 Claims, No Drawings

GLOVE AND GLOVE COMPOSITION

This is a National Stage application of PCT international application PCT/JP2015/055901, filed on Feb. 27, 2015 which claims the priority of Japanese Patent Application No. 2014-054075 entitled "GLOVE AND GLOVE COMPOSITION", filed Feb. 28, 2014, both of which are incorporated herein by reference in their entirety.

TECHNICAL FIELD

Embodiments of the present invention relate to a glove and a composition suitable for manufacturing the glove. Specifically, the embodiments of the present invention relate to a glove maintaining flexibility and having chemical resistance improved, and a composition for manufacturing the glove.

BACKGROUND ART

A rubber glove is widely used in various industrial fields and medical fields such as an electronic component manufacturing industry or a pharmaceutical industry. Conventionally, as a rubber glove having excellent tensile strength, oil resistance, or the like, a glove obtained by dip molding a latex composition obtained by crosslinking a carboxylated acrylonitrile-butadiene copolymer with a sulfur-based vulcanization accelerator such as sulfur or thiazole is used. However, sulfur and the sulfur-based vulcanization accelerator cause various problems, particularly cause Type IV allergy disadvantageously.

Therefore, various non-sulfur-based crosslinked gloves have been proposed. For example, JP 2007-177091 A (Patent Literature 1) discloses a glove using an acid-modified nitrile rubber having a large content of a methyl ethyl ketone insoluble matter. JP2010-144163A (Patent Literature 2) discloses a glove using a carboxylic acid-modified nitrile copolymer containing a monomer containing a crosslinkable functional group such as a glycidyl group as a structural unit. International Publication WO 2011/068394 A (Patent Literature 3) discloses a glove using self-crosslinkable carboxylated acrylonitrile butadiene.

CITATION LIST

Patent Literature

Patent Literature 1: JP 2007-177091 A
Patent Literature 2: JP 2010-144163 A
Patent Literature 3: WO 2011/068394 A

SUMMARY OF INVENTION

Technical Problem

However, in order to increase a content of a methyl ethyl ketone insoluble matter in the glove in Patent Literature 1, it is necessary to use a special polymerization method such as raising a polymerization temperature to 55 to 95° C., and this is not practical. According to study of the inventors, the gloves of Patent Literatures 2 and 3 do not have sufficient chemical resistance to hydrofluoric acid or the like often used in a clean room.

An object of the embodiments of the present invention is to provide a glove having excellent chemical resistance and flexibility and a composition for manufacturing the glove.

Advantageous Effects of Invention

One embodiment of the present invention relates to an emulsion composition including: (1) a carboxylated acrylonitrile butadiene elastomer containing an acrylonitrile residue in an amount of 23 to 30 wt % and an unsaturated carboxylic acid residue in an amount of 3 to 8 wt %, containing a sulfur element in a combustion product of the elastomer detected by a neutralization titration method in an amount of 1 wt % or less of the weight of the elastomer, and having Mooney density ($ML_{(1+4)}$ (100° C.)) of 100 to 220; and (2) a polyacrylonitrile butadiene elastomer containing an acrylonitrile residue in an amount of 20 to 50 wt % and having a weight average molecular weight (in terms of styrene) of 7,000 to 50,000,
wherein a weight ratio of the component (1)/the component (2) is from 70/30 to 90/10.

Another one embodiment of the present invention relates to a glove having a thickness of 0.15 mm or more, obtained from the emulsion composition according to the above embodiment of the present invention.

According to the embodiments of the present invention, by using a specific carboxylated acrylonitrile butadiene elastomer and a specific polyacrylonitrile butadiene in combination thereof at a specific ratio, it is possible to provide a glove having excellent flexibility and excellent chemical resistance even when the glove is thick.

DESCRIPTION OF EMBODIMENTS

Hereinafter, preferable embodiments of the present invention will be described, but the present invention is not limited thereto.

<Carboxylated Acrylonitrile Butadiene Elastomer>

A carboxylated acrylonitrile butadiene elastomer (hereinafter, referred to as "XNBR") contains an acrylonitrile residue in an amount of 23 to 30 wt % and an unsaturated carboxylic acid residue in an amount of 3 to 8 wt %, and widely includes a carboxyl group-containing elastomer obtained by copolymerizing acrylonitrile and butadiene constituting a main chain of a rubber, at least one unsaturated carboxylic acid, and another optional copolymerizable monomer. Some of the carboxyl groups may be derivatized (for example, an ester or an amide) to form a crosslinked structure.

The XNBR has a non-sulfur crosslinked structure, and therefore does not require sulfur crosslinking. Therefore, when a glove is formed, the glove does not cause a problem such as allergy due to a sulfur component.

The acrylonitrile residue is contained in an amount of 23 to 30 wt % of the XNBR weight or in an amount of 23 wt % or more and less than 30 wt % thereof, preferably in an amount of 25 to 29 wt % t. The amount of the acrylonitrile residue can be determined by calculating the amount of a nitrile group from the amount of a nitrogen atom determined by elemental analysis.

Previously, the present inventors completed an invention of a carboxylated acrylonitrile butadiene elastomer containing an acrylonitrile residue in an amount of 30 to 40 wt % and an unsaturated carboxylic acid residue in an amount of 3 to 8 wt % and a glove using the elastomer, and have filed a patent application as Japanese Patent application No. 2012-191264. The embodiments of the present invention are characterized in that the amount of an acrylonitrile residue in XNBR is reduced compared to the embodiments of the previous application. This makes it possible to form a thick glove having a thickness of 0.15 mm or more while flexibility is maintained, and to secure chemical resistance.

That is, an acrylonitrile component increases chemical resistance (solvent resistance), but also increases rigidity. Therefore, in a case where the amount of the acrylonitrile component in XNBR is more than 30 wt % as the upper limit, when a thick glove having a thickness of 0.15 mm or more is molded, flexibility tends to be decreased. For example, when comparison is made with gloves having a thickness of 0.15 mm, a glove containing an acrylonitrile residue in an amount of 23 to 30 wt % has better flexibility (for example, 100% modulus) than the elastomer of the previous application, containing a large amount of acrylonitrile.

On the other hand, in a case where the amount of the acrylonitrile residue in XNBR is less than 23 wt % as the lower limit, when a glove having a thickness of 0.15 mm to 0.6 mm according to a preferable embodiment is formed, chemical resistance may be insufficient.

XNBR contains an unsaturated carboxylic acid residue in an amount of 3 to 8 wt % of the XNBR weight, preferably in an amount of 4 to 6 wt % thereof. In a case where the amount of the unsaturated carboxylic acid residue is less than 3 wt % as the lower limit, formation of crosslinking by a divalent ion described below is not necessarily obtained. On the other hand, in a case where the amount of the unsaturated carboxylic acid residue is more than 8 wt % as the upper limit, too much formation of crosslinking occurs, and physical properties of a rubber glove as a final product, such as tensile strength or tensile stress, may be reduced.

As the unsaturated carboxylic acid, acrylic acid and/or methacrylic acid (hereinafter, referred to as "(meth)acrylic acid") is preferably used, and methacrylic acid is more preferably used.

The amount of the unsaturated carboxylic acid residue can be determined by quantifying a carboxyl group or a carbonyl group derived from the carboxyl group with infrared spectroscopy (IR) or the like.

Another component of XNBR includes a butadiene residue and a crosslinked structure. As a butadiene constituting the butadiene residue, 1,3-butadiene is preferable.

The amount of the butadiene residue is preferably from 62 to 74 wt %, and more preferably from 66 to 72 wt % with respect to the total amount 100 wt % of the butadiene residue, the acrylonitrile residue, and the unsaturated carboxylic acid residue. When the amount of the butadiene residue is within the range, it is possible to obtain a final product having various excellent physical properties.

XNBR has Mooney viscosity ($ML_{(1+4)}$ (100° C.)) of 100 to 220, and preferably of 100 to 190. In a case where Mooney viscosity is less than 100, the viscosity is low, and it is difficult to obtain sufficient strength as product characteristics of a glove. On the other hand, the upper limit value (220) of Mooney viscosity is an actual measurement limit of a Mooney viscometer. XNBR having Mooney viscosity more than this value has high viscosity, and molding thereof is difficult.

Mooney viscosity can be measured in accordance with JIS K6300-1: 2001 "unvulcanized rubber-physical properties, Part 1: Determination of viscosity and scorch time according to Mooney viscometer".

The crosslinked structure of XNBR is a non-sulfur crosslinked structure, and this can suppress the content of a sulfur element to 1 wt % or less of the XNBR weight. The amount of the sulfur element can be detected by a neutralization titration method of a XNBR combustion gas absorbing liquid. In this quantitative method, a combustion gas generated by combustion of 0.01 g of a XNBR sample in the air at 1350 C for 10 to 12 minutes is absorbed by $H_2O_2$ water containing a mixed indicator, and neutralization titration is performed with a 0.01 N NaOH aqueous solution.

The non-sulfur crosslinked structure is not particularly limited. Examples thereof include crosslinking between main chains by an organic peroxide, oxime, or the like; crosslinking between carboxyl groups such as an acid anhydride; crosslinking between carboxyl groups with a crosslinking agent such as polyepoxide, polyol, polyimide, mono- and poly-carbodiimide, or polyisocyanate; and crosslinking obtained by introducing a group reactive to a carboxyl group such as a structural unit having a glycidyl group or the like into a main chain and performing a reaction between the reactive group and a carboxyl group.

The non-sulfur crosslinked structure is preferably a self-crosslinked structure. That is, the self-crosslinked structure is crosslinking which is stable in a normal storage condition, but formed without adding a crosslinking agent separately, for example, by evaporating water, heating, or changing pH. Examples of the self-crosslinking include self-crosslinking obtained by auto-oxidation of a carboxyl group, self-crosslinking obtained by introducing an N-methylolacrylamide unit as a methylol amide group and self-condensing the N-methylolacrylamide units, and a Michael reaction between an acetoacetoxy group and an unsaturated bond. A self-crosslinking component or a self-crosslinking agent represented by polyol, polyimide, N-methylol acrylamide, or the like may be used singly or in combination of one or more kinds thereof.

XNBR can contain another unsaturated monomer residue, as necessary, in addition to the acrylonitrile residue, the unsaturated carboxylic acid residue, and the butadiene residue.

Examples of the other unsaturated monomer include an aromatic vinyl monomer such as styrene, α-methyl styrene, or dimethyl styrene; an ethylenically unsaturated carboxylic acid amide monomer such as (meth)acrylamide, N,N-dimethylacrylamide, or N-methylol acrylamide amide; an ethylenically unsaturated carboxylic acid alkyl ester monomer such as methyl (meth)acrylate, ethyl (meth)acrylate, butyl (meth)acrylate, or 2-ethylhexyl (meth)acrylate; and vinyl acetate. These monomers can be used singly or in combination of one or more kinds thereof arbitrarily.

XNBR can be prepared by emulsion-polymerizing an unsaturated carboxylic acid such as acrylonitrile or (meth) acrylic acid, a butadiene such as 1,3-butadiene, and another unsaturated monomer for forming a crosslinked structure or the like, as necessary, according to a conventional method. In emulsion polymerization, an emulsifier, a polymerization initiator, a molecular weight adjusting agent, or the like usually used can be used.

Examples of the emulsifier include an anionic surfactant such as dodecylbenzene sulfonate or an aliphatic sulfonate; a cationic surfactant such as polyethylene glycol alkyl ether or polyethylene glycol alkyl ester; and an amphoteric surfactant. The anionic surfactant is preferably used.

The polymerization initiator is not particularly limited as long as being a radical initiator. However, examples thereof include an inorganic peroxide such as ammonium persulfate or potassium perphosphate; an organic peroxide such as t-butyl peroxide, cumene hydroperoxide, p-menthane hydroperoxide, di-t-butyl peroxide, t-butyl cumyl peroxide, dibenzoyl peroxide, 3,5,5-trimethyl hexanoyl peroxide, or t-butyl peroxy isobutyrate; and an azo compound such as azobisisobutyronitrile, azobis-2,4-dimethylvaleronitrile, azobiscyclohexane carbonitrile, or methyl azobisisobutyrate.

Examples of the molecular weight adjusting agent include a mercaptan such as t-dodecyl mercaptan or n-dodecyl mercaptan; and a halogenated hydrocarbon such as carbon tetrachloride, methylene chloride, or methylene bromide. Among these compounds, a mercaptan is preferable.

Furthermore, a dispersant, a pH adjusting agent, or the like can be used, as necessary.

Subsequently, the polymer obtained by emulsion polymerization is subjected to non-sulfur crosslinking (self-crosslinking or the like) by heating the polymer, evaporating water, or the like to obtain XNBR. However, this crosslinking step may be performed at the same time as crosslinking by a divalent metal ion described below or in a heating step after the ion crosslinking.

<Poly(Acrylonitrile Butadiene) Elastomer>

A poly(acrylonitrile butadiene) elastomer (hereinafter, referred to as "NBR") contains an acrylonitrile residue in an amount of 20 to 50 wt % thereof, preferably in an amount of 30 to 40 wt % thereof, and a butadiene residue as a remaining portion. When the amount of the acrylonitrile residue is less than 20 wt %, chemical resistance of a glove may be reduced. When the amount of the acrylonitrile residue is more than 50 wt %, flexibility may be impaired due to a rigid molecular chain.

The molecular weight of NBR is preferably from 7,000 to 50,000, and more preferably from 9,000 to 30,000 in a weight average molecular weight in terms of styrene. A predetermined molecular weight of NBR does not cause migration to a surface of a glove (bleeding). However, a molecular weight of less than 7,000 may cause migration of NBR to a surface of a glove, and a molecular weight of more than 50,000 may cause insufficient flexibility.

<Emulsion Composition>

An emulsion composition is an emulsion-like composition containing the XNBR as component (1) and the NBR as component (2).

A mixing ratio between component (1) and component (2) is preferably from 70/30 to 90/10, and more preferably from 70/30 to 85/15 in a weight ratio of component (1)/component (2).

The amount of component (1) of less than 70 with respect to the total 100 of component (1) and component (2) may cause insufficient chemical resistance of a glove, and the amount of component (1) of more than 90 may make it difficult to achieve sufficient flexibility of a glove. As described in detail in Examples, this mixing ratio can be determined by extracting component (2) by methyl ethyl ketone extraction under reflux. That is, component (2) is extracted with methyl ethyl ketone because of a low molecular weight (component (1) has a high molecular weight and is insoluble, and therefore is not extracted), and a ratio of component (1)/component (2) can be calculated from a weight of the extracted matter.

The emulsion composition preferably contains a divalent metal oxide and a dispersant in addition to component (1) and component (2). The divalent metal oxide mainly performs ion crosslinking between carboxyl groups in component (1). The emulsion composition is an elastomer emulsion composition crosslinked by the divalent metal oxide while XNBR is present together with NBR (in the presence of NBR).

Examples of the divalent metal oxide include oxides of zinc, calcium, magnesium, and the like. Among these oxides, zinc oxide is preferable. The content of the divalent metal oxide is preferably from 0.5 to 4.0 parts by weight, and more preferably from 0.7 to 3.0 with respect to a resin component, that is, the total 100 parts by weight of component (1) and component (2).

As the dispersant, an anion surfactant is preferable. Examples thereof include a carboxylate, a sulfonate, a phosphate, a polyphosphate, a polymerized alkyl aryl sulfonate, a polymerized sulfonated naphthalene, and a polymerized naphthalene/formaldehyde condensation polymer. A sulfonate is preferably used. The content of the dispersant is preferably from 0.5 to 4 parts by weight, and more preferably from 1 to 3 parts by weight with respect to the total 100 parts by weight of component (1) and component (2).

The emulsion composition can contain a conventional additive in addition to the above components. Examples of the conventional additive include a pH adjusting agent, a pigment, an antioxidant, a chain transfer agent, and a polymerization initiator. The pH of the emulsion composition is preferably adjusted to eight or more. As the pH adjusting agent, potassium hydroxide is usually used. The use amount thereof is usually preferably from 0.1 to 2.0 parts by weight with respect to 100 parts by weight of the composition. As the pigment, for example, titanium dioxide is used. Although not particularly limited, a hindered phenol type antioxidant can be used as the antioxidant, a mercaptan represented by t-dodecyl mercaptan or the like can be used as the chain transfer agent, and an inorganic peroxide represented by sodium persulfate or the like, an organic peroxide represented by benzoyl peroxide or the like, a chelating agent represented by sodium ethylenediamine tetraacetate or the like can be used as the polymerization initiator.

The emulsion composition can be manufactured by mixing component (1), component (2), a divalent metal oxide, a dispersant, additives, and water by a conventional mixing method, for example, with a mixer. The solid concentration of the emulsion composition is preferably from 30 to 60 wt %, and more preferably from 40 to 50 wt %.

<Glove>

A glove can be manufactured using the emulsion composition by a dipping method including the following steps (1) to (4).

The glove has a thickness preferably of 0.15 mm (150 µm) or more, and more preferably of 0.18 mm or more in order to secure chemical resistance and flexibility. The upper limit value of the thickness is not particularly limited, but is preferably 0.6 mm (600 µm) or less as a thickness suitable for use in a clean room particularly requiring flexibility or the like.

(1) A dip molding die (hereinafter, referred to as "former") is immersed in a coagulant (flocculant) liquid, and the coagulant is attached to the former. The flocculant is not particularly limited as long as being an inorganic salt having an effect of precipitating an elastomer. For example, a 5-20 wt % aqueous solution of calcium chloride, magnesium chloride, or the like can be preferably used.

(2) The former to which the coagulant is attached is dried, for example at a temperature of 50 to 70° C., and then is immersed in the emulsion composition during a period of time corresponding to a target thickness of a glove, generally for about 1 to 60 seconds, usually for 1 to 20 seconds. The former may be immersed in the coagulant liquid and the emulsion composition a plurality of times by repeating steps (1) and (2) such that the resulting glove has a desired thickness.

(3) The former coated with the emulsion composition is heated at 80 to 120° C. for 20 to 70 seconds, and then is washed with water.

(4) After being washed with water, the former is subjected to beading (sleeve winding) and a post-heating step at 120 to 150° C.

The glove obtained as described above is resistant to a chemical such as hydrofluoric acid, but is highly flexible, and therefore is particularly suitable for work in a clean room or the like.

In a glove, a methyl ethyl ketone (MEK) extraction amount under reflux is preferably from 10 to 30 wt % of the glove, and more preferably from 15 to 30 wt % thereof. This extraction amount can be calculated by immersing the glove in MEK, performing extraction under reflux for eight hours, then recovering the resulting extraction liquid, and measuring the weight of a residue after concentration and drying.

Chemical resistance of a glove is preferably evaluated using any one or more compounds of 47% hydrofluoric acid, methanol, ethanol, acetone, and N-methylpyrrolidone.

Specifically, chemical resistance of a glove can be evaluated by turning the glove inside out, putting 10 ml of any one of 47% hydrofluoric acid, methanol, ethanol, acetone, and N-methylpyrrolidone into a middle finger portion of the glove, immersing this middle finger portion in 30 ml of pure water in this state, allowing the middle portion to stand at room temperature for two hours, and quantifying a component eluted into the pure water by ion chromatography or gas chromatography. Permeation amounts of chemical agents preferably satisfy the following standards.

fluorine ion permeation amount: 0.1 g or less (more preferably, 0.09 g or less)

each of methanol permeation amount and ethanol permeation amount: 0.3 g or less (more preferably, 0.27 g or less)

acetone permeation amount: 5.0 g or less (more preferably, 4.0 g or less)

N-methylpyrrolidone permeation amount: 0.15 g or less (more preferably, 0.12 g or less)

A glove preferably satisfies any one or more of the above standards for chemical agent permeation amounts, and more preferably satisfies all the standards.

Furthermore, the total value of the permeation amounts of the five compounds of 47% hydrofluoric acid, methanol, ethanol, acetone, and N-methylpyrrolidone is preferably 5.85 g or less, and more preferably 5.0 g or less.

A toluene weight swelling ratio of a glove is preferably from 180 to 350 wt %, and more preferably from 250 to 340 wt %. As the toluene swelling ratio is lower, a crosslinking density of a glove is higher. When a crosslinked polymer is immersed in a good solvent such as toluene, the good solvent tries to dissolve a polymer chain to extend the polymer chain. However, this is suppressed by elasticity of a mesh of the crosslinked polymer to reach swelling equilibrium. Therefore, the crosslinking density of the crosslinked polymer is inversely proportional to an equilibrium swelling ratio in the good solvent. A toluene weight swelling ratio of more than 350 wt % makes the crosslinking density low, and causes insufficient strength of a glove when the glove is formed. A toluene weight swelling ratio of less than 180 wt % makes the crosslinking density high, and may cause insufficient flexibility.

As for mechanical characteristics of a glove measured according to JIS K6251:2010, in order to keep strength sufficient and proper as a glove, that is, strength not too rigid, tensile strength indicating strength of a rubber glove (a higher value indicates higher strength) is preferably from 23 to 35 MPa. Elongation at break indicating flexibility of a rubber glove (a higher value indicates higher flexibility) is preferably 400% or more. Similarly, 100% modulus indicating flexibility of a rubber glove (also referred to as 100% elastic modulus or 100% tensile strength) is preferably from 11 to 3 MPa in order to prevent texture at the time of attachment of a glove from being impaired.

EXAMPLES

Hereinafter, the present invention will be described based on Examples, but is not limited thereto.

Examples 1 to 3 and Comparative Examples 1 to 8

1. Preparation of XNBR

Seven kinds of XNBRs (XNBR-A to XNBR-G) illustrated in Table 1 were prepared according to the following procedures.

An emulsion liquid obtained by adding 120 parts of ion-exchanged water to 28 parts by weight of acrylonitrile, 66 parts by weight of 1,3-butadiene, 6 parts by weight of methacrylic acid, 0.3 parts by weight of N-methylol acrylamide, 3 parts by weight of sodium dodecylbenzene sulfonate, 0.3 parts by weight of potassium persulfate, and 0.05 parts by weight of sodium ethylenediamine tetraacetate was put into a pressure-resistant polymerization reactor equipped with a stirrer, and was reacted for 18 hours while the temperature was held at 40° C. Thereafter, a reaction stop agent was added thereto to complete polymerization.

An unreacted monomer was removed from the resulting copolymer latex, and the pH and the concentration of the copolymer latex were adjusted to obtain a XNBR-A emulsion having pH of 8.5 and a solid concentration of 45 wt %.

The copolymer latex was obtained by a reaction (crosslinking reaction) between N-methylol acrylamide and a terminal carboxyl group of methacrylic acid added to acrylonitrile-butadiene.

XNBR-B was manufactured in a similar manner to XNBR-A except that 30 parts by weight of acrylonitrile, 64 parts by weight of 1,3-butadiene, 6 parts by weight of methacrylic acid, and 0.4 parts by weight of N-methylol acrylamide were used and a reaction was performed for 24 hours while the temperature was held at 30° C.

XNBR-C was manufactured in a similar manner to XNBR-A except that 25 parts by weight of acrylonitrile, 69 parts by weight of 1,3-butadiene, and 0.3 parts by weight of N-methylol acrylamide were used and a reaction was performed for 18 hours while the temperature was held at 40° C.

XNBR-D was manufactured in a similar manner to XNBR-A except that 28 parts by weight of acrylonitrile, 66 parts by weight of 1,3-butadiene, and 0.5 parts by weight of N-methylol acrylamide were used and a reaction was performed for 24 hours while the temperature was held at 30° C.

XNBR-E was manufactured in a similar manner to XNBR-A except that 20 parts by weight of acrylonitrile, 74 parts by weight of 1,3-butadiene, and 0.3 parts by weight of N-methylol acrylamide were used and a reaction was performed for 18 hours while the temperature was held at 40° C.

XNBR-F was manufactured in a similar manner to XNBR-A except that 28 parts by weight of acrylonitrile and 66 parts by weight of 1,3-butadiene were used without use of N-methylol acrylamide and a reaction was performed for 16 hours while the temperature was held at 50° C.

XNBR-G was manufactured in a similar manner to XNBR-A except that 28 parts by weight of acrylonitrile, 66 parts by weight of 1,3-butadiene, and 0.5 parts by weight of N-methylol acrylamide were used and a reaction was performed for 24 hours while the temperature was held at 30° C.

Characteristics of the obtained XNBRs were measured by the following method. Table 1 illustrates results thereof.

As illustrated in Table 1, XNBR-E, XNBR-F, and XNBR-G were used for gloves in Comparative Examples described below.

<Unsaturated Carboxylic Acid Residue>

Each of the XNBR emulsions was dried, and a film was manufactured. The film was measured by FT-IR, a ratio of absorbance (Abs) at 1699 $cm^{-1}$ and 2237 $cm^{-1}$ was determined, and the amount of an unsaturated carboxylic acid residue was determined by the following formula.

the amount of unsaturated carboxylic acid residue(wt %)=[Abs (1699 $cm^{-1}$)/Abs(2237 $cm^{-1}$)]/0.2661  (formula 1)

In formula 1, "0.2661" is a coefficient obtained by making a calibration curve from data of a plurality of samples the amount of an unsaturated carboxylic acid residue and the amount of an acrylonitrile residue of which are known.

<Mooney Density>

200 ml of a saturated aqueous solution (coagulating liquid) of a 4:1 mixture of calcium nitrate and calcium carbonate was stirred at room temperature. An emulsion of each of the XNBRs was dropwise added thereto by a pipette to precipitate a solid rubber. The resulting solid rubber was taken out from the coagulating liquid, and stirring washing with about 1000 ml of ion-exchanged water was repeated ten times. Thereafter, the solid rubber was squeezed and dehydrated, and was subjected to vacuum drying (60° C., 72 hours) to obtain a rubber sample for Mooney viscosity measurement.

The resulting rubber for measurement was allowed to pass through a roll having a roll temperature of 50° C., a roll gap of about 0.5 mm, and a size of 6 inches several times until the rubber was settled. The resulting rubber was measured in accordance with JIS K6300-1: 2001 "unvulcanized rubber-physical properties, Part 1: Determination of viscosity and scorch time according to Mooney viscometer". The Mooney viscosity of XNBR-G was more than a measurement upper limit value at a measurement temperature of 100° C.

<Content of Sulfur>

0.1 g of a solid in an emulsion of each of the XNBRs was burned in a combustion furnace at 1350° C. for 12 minutes, and a generated combustion gas was absorbed by an absorbing liquid ($H_2O_2$ water mixed liquid obtained by adding one to a few drops of diluted sulfuric acid). Thereafter, quantitative measurement was performed by neutralization titration with 0.01 N NaOH water.

In Table 1, "NMA" indicates N-methylol acrylamide, "ML(1+4) 100° C." indicates Mooney density at a measurement temperature of 100° C., and "S (wt %)" indicates a content of a sulfur element.

2. Preparation of NBR

Three kinds of NBRs (NBR-a to XNBR-c) illustrated in Table 2 were prepared according to the following procedures.

An emulsion liquid obtained by adding 120 parts of ion-exchanged water to 35 parts by weight of acrylonitrile, 65 parts by weight of 1,3-butadiene, 3 parts by weight of sodium dodecylbenzene sulfonate, 0.3 parts by weight of potassium persulfate, 0.05 parts by weight of sodium ethylenediamine tetraacetate, and 1.0 part by weight of t-dodecyl mercaptan was put into a pressure-resistant polymerization reactor equipped with a stirrer, and was reacted at a temperature of 60 to 80° C. for five hours. After the reaction, a reaction stop agent was added thereto to complete polymerization.

An unreacted monomer was removed from the resulting copolymer latex, and the pH and the concentration of the copolymer latex were adjusted to obtain NBR-a having pH of 8.5 and a solid concentration of 46%. The weight average molecular weight of NBR-a in terms of polystyrene by GPC (gel permeation chromatography) was 19700.

Measurement conditions of the weight average molecular weight by GPC are as follows.

Apparatus: HLC-8220GPC manufactured by Tosoh Corporation column: Shodex KF-G+KF-805L×2+KF-800D eluent: THF temperature: column thermostatic bath 40° C.

flow rate: 1.0 ml/min concentration: 0.1 wt/vol % injection volume: 100 µl pretreatment: filtration with 0.2 µm filter detector: differential refractometer (RI)

NBR-b was manufactured in a similar manner to NBR-a except that 0.5 parts by weight of t-dodecyl mercaptan was used. The solid concentration thereof was 46%, and the weight average molecular weight thereof in terms of polystyrene was 10900.

NBR-c was manufactured in a similar manner to NBR-a except that 0.8 parts by weight of t-dodecyl mercaptan was used. The weight average molecular weight (Mw) thereof in terms of polystyrene was 6600.

Table 2 collectively illustrates the weight average molecular weight (Mw) of each of the resulting NBR-a to NBR-c, t-dodecyl mercaptan wt % thereof, and the solid concentration thereof. As illustrated in Table 2, NBR-c has a small weight average molecular weight, and is used for a glove in Comparative Examples described below.

TABLE 2

|  | NBR-a | NBR-b | NBR-c |
|---|---|---|---|
| Mw | 19700 | 10900 | 6600 |
| t-dodecyl mercaptan (wt %) | 1 | 0.5 | 0.8 |
| solid (wt %) | 46 | 46 | 46 |

TABLE 1

|  | XNBR-A | XNBR-B | XNBR-C | XNBR-D | XNBR-E | XNBR-F | XNBR-G |
|---|---|---|---|---|---|---|---|
| acrylonitrile residue (wt %) | 28 | 30 | 25 | 28 | 20 | 28 | 28 |
| introduction amount of methacrylic acid (parts by weight) | 6 | 6 | 6 | 6 | 6 | 6 | 6 |
| carboxylic acid residue (wt %) | 5 | 5 | 5 | 5 | 5 | 5 | 5 |
| introduction amount of NMA (parts by weight) | 0.3 | 0.4 | 0.3 | 0.4 | 0.3 | 0 | 0.5 |
| ML (1 + 4) 100° C. | 130 | 180 | 130 | 180 | 130 | 90 | >220 |
| S (wt %) | 0.45 | 0.45 | 0.45 | 0.45 | 0.45 | 0.45 | 0.45 |
| solid (wt %) | 45 | 45 | 45 | 45 | 45 | 46 | 46 |

3. Preparation of Emulsion Composition

Each of XNBRs illustrated in Table 1 and each of NBRs illustrated in Table 2 were mixed with the kind and a ratio illustrated in Table 3. An additive illustrated in Table 4 was added to 100 parts by weight of this mixed resin, and the resulting mixture was stirred with a mixer to prepare emulsion compositions 1 to 11 used in Examples 1 to 3 and Comparative Examples 1 to 8. In Table 3, A to G indicate XNBR-A to XNBR-G, respectively, and a to c indicate NBR-a to NBR-c, respectively. For example, emulsion composition 1 in Example 1 in Table 3 is obtained by mixing XNBR-A and NBR-a at a weight ratio of 85:15 and adding an additive in Table 4 thereto. In Table 4, the dispersant is sodium alkylbenzene sulfonate, the antioxidant is 2,4,6-tri-tert-butylphenol, and the colorant is fast green FCF.

TABLE 3

|  | Example 1 | Example 2 | Example 3 | Comparative Example 1 | Comparative Example 2 | Comparative Example 3 |
|---|---|---|---|---|---|---|
| emulsion composition | 1 | 2 | 3 | 4 | 5 | 6 |
| XNBR/NBR | A/a = 85/15 | B/b = 80/20 | C/a = 85/15 | A/a = 92/8 | A/a = 85/15 | D/c = 95/5 |

|  | Comparative Example 4 | Comparative Example 5 | Comparative Example 6 | Comparative Example 7 | Comparative Example 8 |
|---|---|---|---|---|---|
| emulsion composition | 7 | 8 | 9 | 10 | 11 |
| XNBR/NBR | D/c = 95/5 | E/a = 85/15 | F/a = 85/15 | G/b = 85/15 | A/b = 65/35 |

TABLE 4

|  | parts by weight |
|---|---|
| KOH | 1.35 |
| zinc oxide | 1.1 |
| titanium oxide (whitening agent) | 0.5 |
| dispersant | 1.5 |
| antioxidant | 0.25 |
| colorant | 0.05 |

4. Manufacturing Glove

Gloves in Examples and Comparative Examples were manufactured using the above emulsion compositions by the following dipping method.

(1) A former as a glove die was washed with a washing liquid and then with cold water, was dried, and then was immersed in an aqueous solution in which calcium nitrate as a coagulant was dissolved in such an amount that the $Ca^{2+}$ ion concentration was 10 wt % for 15 seconds.

(2-a) The former to which the coagulant was attached was partially dried at 60° C. for about one minute.

(2-b) The formed was immersed in an emulsion composition adjusted to 30° C. for 20 seconds.

(2-c) The former was immersed in the coagulant and the emulsion composition a plurality of times alternately until the attachment amount of the emulsion composition became a desired amount (film thickness).

(3) The former was taken out from the emulsion composition, was washed with water, and then was immersed in warm water (50° C.) for 140 seconds.

(4) The former covered with a film of the emulsion composition was dried at 120° C. for 300 seconds, and then was maintained at 60° C. for 80 seconds. The resulting glove was taken out from the former Various characteristics of the resulting glove were evaluated by the following method. Table 5 illustrates results thereof.

<Component of Glove Thermally Extracted with Methyl Ethyl Ketone>

A glove was immersed in methyl ethyl ketone (MEK), and extraction was performed under reflux for eight hours. Thereafter, the resulting extraction liquid was recovered, and the weight of a residue after concentration and drying was measured with a four-digit balance.

<Toluene Swelling Ratio>

A glove was immersed in toluene at room temperature. The weight after 72 hours was divided by an initial weight to determine a swelling ratio (%).

<Flexibility of Glove>

Flexibility of a glove was evaluated by tensile characteristics.

A dumbbell-shaped No. 5 test piece of JIS K6251: 2010 was cut out from a glove. Tensile strength (MPa) thereof, elongation at break (%) thereof, and 100% modulus (100% tensile elastic modulus) (MPa) thereof were measured using a TENSILON universal tensile testing machine "RTC-1310A" manufactured by A & D Company, Limited at a test speed of 500 mm/min, a distance of 75 mm between chucks, and a distance of 25 mm between marked lines.

<Chemical Resistance of Glove>

Chemical resistance of a glove was examined with the amount of a chemical agent passing through the glove by the following method.

A glove was turned inside out, 10 ml of any one chemical agent selected from 47% hydrofluoric (HF) acid, methanol, ethanol, acetone, and N-methylpyrrolidone (NMP) was put into a middle finger portion of the glove, this middle finger portion was immersed in 30 ml of pure water in this state and was allowed to stand at room temperature for two hours, and then, the weight of each of the chemical agents eluted into the pure water was quantified by ion chromatography or gas chromatography as follows. In Table 5, "ND" indicates that the amount was below a detection limit.

<Measurement Conditions in Ion Chromatography> target component: fluorine ion (F) in 47% hydrofluoric (HF) acid device name: DX-500 type manufactured by DIONEX Corporation guard column: IonPac AG-17 separation column: IonPac AG-17 suppressor: ASRS 300 4 mm eluent: 15 mmol/l potassium hydroxide flow rate: 2.0 ml/min <Measurement Conditions in Gas Chromatography>

Target Component: Methanol, Ethanol, Acetone, N-Methylpyrrolidone device name: GC-2014 manufactured by Shimadzu Corporation column: DBWAX (60 m, 0.25 mmφ, thickness 0.25 μm)

He gas: 0.6 ml/min, injection temperature: 200° C., detector temperature 210° C.

temperature: 40° C. (3 min)→200° C. (10 min), the temperature was raised at 10° C./min detector: FID

TABLE 5

| | | | Example 1 | Example 2 | Example 3 | Comparative Example 1 | Comparative Example 2 | Comparative Example 3 |
|---|---|---|---|---|---|---|---|---|
| XNBR acrylonitrile residue (wt %) | | | 28 | 30 | 25 | 28 | 28 | 28 |
| XNBR/NBR | | | 85/15 | 80/20 | 85/15 | 92/8 | 85/15 | 95/5 |
| thickness (mm) | | | 0.27 | 0.18 | 0.54 | 0.27 | 0.10 | 0.18 |
| the amount of component thermally extracted with MEK (wt %) | | | 14.3 | 19.7 | 14.5 | 7.3 | 14.8 | 4.7 |
| toluene swelling ratio (%) | | | 300 | 300 | 250 | 300 | 300 | 230 |
| tensile strength (MPa) | | | 27.9 | 25.1 | 24.0 | 26.7 | 28.3 | 26.7 |
| elongation at break (%) | | | 610 | 590 | 500 | 550 | 610 | 400 |
| 100% tensile strength (MPa) | | | 2.5 | 2.9 | 2.4 | 3.5 | 2.5 | 6.7 |
| permeation amount of chemical agent (g) | 47% HF acid aqueous solution | | 0.09 | 0.1 | 0.01 | 0.10 | 0.24 | 0.30 |
| | methanol | | 0.14 | 0.26 | ND < 0.005 | 0.15 | 0.39 | 0.02 |
| | ethanol | | 0.11 | 0.09 | ND < 0.005 | 0.11 | 0.30 | 0.02 |
| | acetone | | 2.3 | 1.9 | 0.25 | 2.8 | 6.3 | 8.0 |
| | NMP | | 0.08 | 0.06 | 0.05 | 0.11 | 0.22 | 0.70 |
| total permeation amount of chemical agents (g) | | | 2.72 | 2.41 | 0.31 | 3.27 | 7.45 | 9.04 |

| | | Comparative Example 4 | Comparative Example 5 | Comparative Example 6 | Comparative Example 7 | Comparative Example 8 |
|---|---|---|---|---|---|---|
| XNBR acrylonitrile residue (wt %) | | 28 | 20 | 28 | 28 | 28 |
| XNBR/NBR | | 95/5 | 85/15 | 85/15 | 85/15 | 65/35 |
| thickness (mm) | | 0.54 | 0.54 | 0.27 | 0.27 | 0.27 |
| the amount of component thermally extracted with MEK (wt %) | | 4.6 | 14.5 | 14.7 | 14.5 | 31.5 |
| toluene swelling ratio (%) | | 230 | 260 | 340 | 380 | 300 |
| tensile strength (MPa) | | 27.3 | 17.8 | 10.1 | 17.8 | 21.0 |
| elongation at break (%) | | 400 | 550 | 600 | 600 | 650 |
| 100% tensile strength (MPa) | | 6.9 | 1.8 | 2.1 | 3.1 | 2.4 |
| permeation amount of chemical agent (g) | 47% HF acid aqueous solution | 0.13 | 0.05 | 0.11 | 0.1 | 0.18 |
| | methanol | ND < 0.005 | ND < 0.005 | 0.20 | 0.15 | 0.28 |
| | ethanol | ND < 0.005 | ND < 0.005 | 0.15 | 0.15 | 0.20 |
| | acetone | 3.9 | 8.8 | 3.0 | 2.8 | 6.2 |
| | NMP | 0.32 | 0.04 | 0.09 | 0.10 | 0.19 |
| total permeation amount of chemical agents (g) | | 4.35 | 8.89 | 3.55 | 3.34 | 7.05 |

As illustrated in Table 5, in gloves in Examples 1 to 3, the permeation amount of a fluorine ion measured was 0.1 g or less, each of the permeation amounts of methanol and ethanol was 0.3 g or less, the permeation amount of acetone was 5.0 g or less, and the permeation amount of NMP was 0.15 g or less, and excellent chemical resistance was exhibited. In addition, all the gloves in Examples 1 to 3 had excellent flexibility.

On the other hand, a glove in Comparative Example 1 had a lower amount of NBR with respect to XNBR in an emulsion composition, and therefore had larger 100% tensile strength and poorer flexibility than the glove in Example 1. A glove in Comparative Example 2 was manufactured using the same emulsion composition as in Example 1, but had a thin film thickness of 0.1 mm, and therefore had poor chemical resistance. Each of gloves in Comparative Examples 3 and 4 had a low amount of NBR with respect to XNBR in an emulsion composition, and therefore had large 100% tensile strength and poor flexibility regardless of the thickness of the glove. A glove in Comparative Example 5 had an amount of an acrylonitrile residue as small as 20 wt % in XNBR, and therefore had poor chemical resistance even with a large thickness of the glove. A glove in Comparative Example 6 used XNBR having low Mooney viscosity, and a glove in Comparative Example 7 used XNBR having high Mooney viscosity. Therefore, the gloves in Comparative Examples 6 and 7 had poor tensile strength. A glove in Comparative Example 8 had a large amount of NBR added to XNBR in an emulsion composition, and therefore had poor tensile strength and a large methyl ethyl ketone (MEK) extraction amount.

INDUSTRIAL APPLICABILITY

A glove according to the embodiments of the present invention and a composition for the glove are used for work in a clean room or the like.

The invention claimed is:

1. An emulsion composition comprising:
   (1) a carboxylated acrylonitrile butadiene elastomer containing an acrylonitrile residue in an amount of 23 to 30 wt % and
   an unsaturated carboxylic acid residue in an amount of 3 to 8 wt %, containing a sulfur element in a combustion product of the elastomer detected by a neutralization titration method in an amount of 1 wt % or less of the weight of the elastomer, and having Mooney viscosity (ML(1+4) (100° C.)) of 100 to 220; and
   (2) a polyacrylonitrile butadiene elastomer containing an acrylonitrile residue in an amount of 20 to 50 wt % and having a weight average molecular weight (in terms of styrene) of 7,000 to 50,000,
   wherein a weight ratio of the component (1)/the component (2) is from 70/30 to 90/10.

2. The emulsion composition according to claim 1, wherein the Mooney viscosity (ML(1+4) (100° C.)) of the component (1) is from 100 to 190.

3. The emulsion composition according to claim 1, wherein the weight average molecular weight of the component (2) is from 9,000 to 30,000.

4. The emulsion composition according to claim 1, wherein the weight ratio of the component (1)/the component (2) is from 70/30 to 85/15.

5. The emulsion composition according to claim 1, further comprising:
   (3) a divalent metal oxide in an amount of 0.5 to 4.0 parts by weight; and
   (4) a dispersant in an amount of 0.5 to 2.0 parts by weight, with respect to the total 100 parts by weight of the component (1) and the component (2).

6. The emulsion composition according to claim 1, wherein the emulsion composition is a composition for preparing a glove having a thickness of 0.15 mm or more.

7. A glove having a thickness of 0.15 mm or more, obtained from the emulsion composition according to claim 1.

8. The glove according to claim 7, wherein a methyl ethyl ketone extraction amount under reflux is from 15 to 30 wt % of the glove.

9. The glove according to claim 7, wherein a permeation amount of a chemical agent measured by a method for turning the glove inside out, putting 10 ml of any one chemical agent selected from the group consisting of 47% hydrofluoric acid, methanol, ethanol, acetone, and N-methylpyrrolidone into a middle finger portion of the glove, immersing the middle finger portion in 30 ml of pure water in this state, allowing the middle finger portion to stand at room temperature for two hours, and then quantifying the chemical agent eluted into the pure water by ion chromatography or gas chromatography, satisfies the following one or more:
   fluorine ion permeation amount: 0.1 g or less;
   each of methanol permeation amount and ethanol permeation amount: 0.3 g or less;
   acetone permeation amount: 5.0 g or less; and
   N-methylpyrrolidone permeation amount: 0.15 g or less.

* * * * *